Dec. 15, 1953

C. W. LINCOLN ET AL 2,662,419

TRANSMISSION CONTROL

Filed Nov. 5, 1952

INVENTORS
Clovis W. Lincoln, &
BY Errol A. Schroeder
Willits, Helwig & Baillio
ATTORNEYS

UNITED STATES PATENT OFFICE 2,662,419

TRANSMISSION CONTROL

Clovis W. Lincoln, Saginaw, and Errol A. Schroeder, Midland, Mich., assignors to General Motors Corporation, Detroit, Mich., a corporation of Delaware Application November 5, 1952, Serial No. 318,824

6 Claims. (Cl. 74—485)

This invention relates to devices for use in controlling the operation of automatic transmission mechanisms and particularly to devices of this kind that may be employed in controlling automatic transmissions for automotive and other uses.

Conventional gearshift transmissions that are used for such purposes usually have actuating members that require both rotational and axial movement. These movements are usually affected by the operation of a shift lever mounted on a steering or other column and through which suitable shaft means for transmitting these movements extend.

It is now proposed to construct control devices particularly for use with automatic transmission mechanisms employed for the above purposes and which have steering or other columns through which a rotatable shaft means may project. It is proposed to construct the rotatable shaft means, the steering column, and the shift lever in such manner that the structure will be simple, reliable, easily assembled and serviced and may be rotated without axial movement for actuating the automatic transmission referred to.

Figure 1:
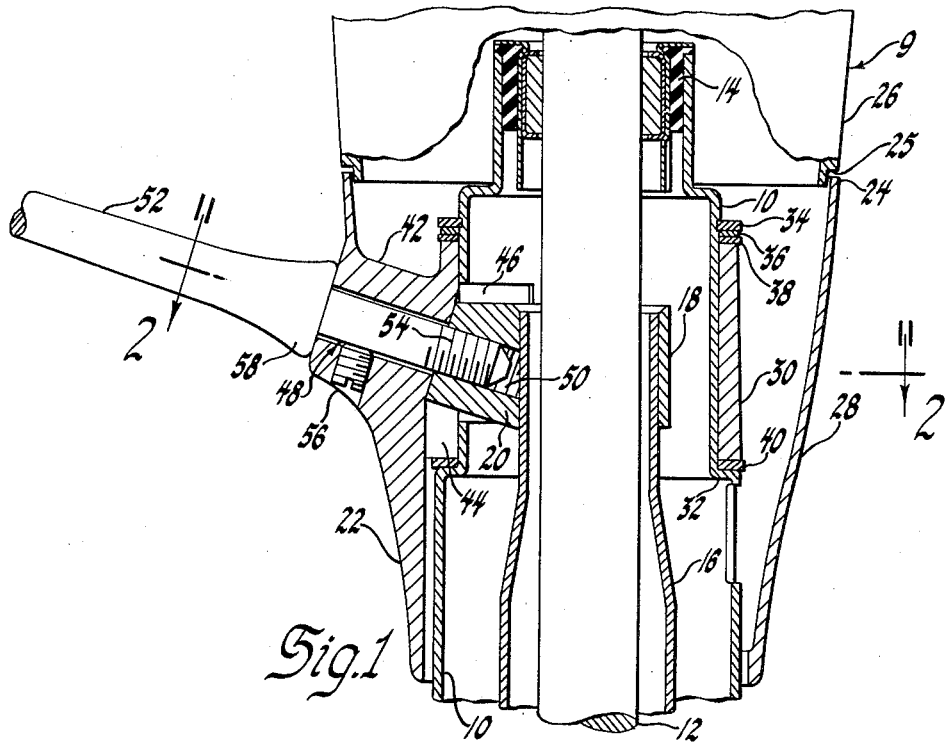
Figure 1 shows a fragmentary cross-sectional view of a steering column having a control device embracing the principals of this invention associated therewith for use in controlling an automatic transmission mechanism which may be employed for automotive and other uses.
Figure 2:
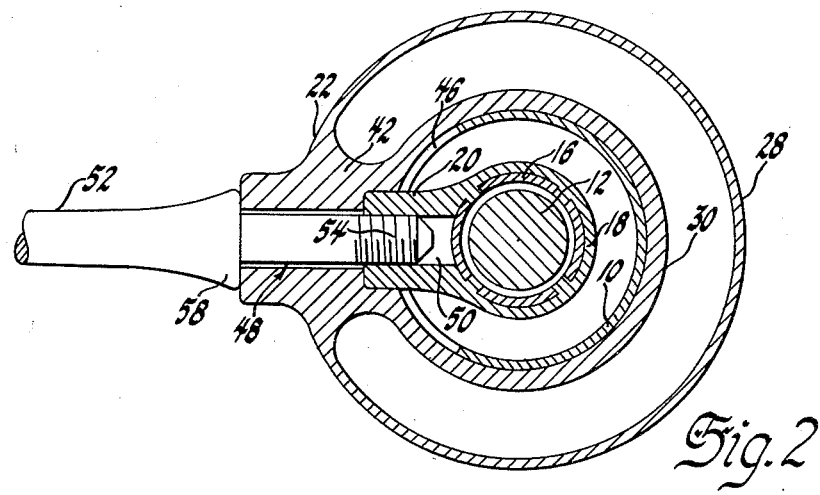
Figure 2 is a cross-sectional view of Figure 1 taken substantially in the plane of lines 2—2 and as viewed in the direction of the arrows thereon.

A steering column 9, such as may be used for automotive or similar uses, is provided with a tubular column member 10 with a steering shaft 12 mounted therein. Bearing means 14 at the upper end of the tubular column 10 supports the steering shaft 12 in spaced relation to the tubular column. A transmission control sleeve 16 is disposed about the steering shaft 12 and within the tubular column 10 and has a collar 18 secured to the upper end thereof by staking or other suitable means. An enlarged boss 20 protrudes from one side of the collar 18. A shroud member 22 formed to provide outer and inner annular walls 28 and 30 is disposed about the upper end of the tubular column 10. Inner annular wall 30 rotatably engages an annular shoulder 32 on the tubular column 10. The upper edge 24 of the outer annular wall 28 merges with an annular groove 25 in a steering hub 26. The steering hub 26 may be removably secured to the steering shaft 12. A snap ring 34 is mounted on the tubular column 10 above the inner annular wall 30 to retain the inner annular wall on the upper end of the tubular column. The snap ring 34 also cooperates with the spring washer 36 and the thrust washers 38 and 40 to prevent axial movement of the inner annular wall 30 from the annular shoulder 32.

The annular outer and inner wall members 28 and 30 of the shroud member 22 are joined together at one side of the shroud to form a bridge 42. Bridge 42 has a groove 44 extending into the inner annular wall 30 and adapted to receive the boss 20. A portion of the back wall of groove 44 extends obliquely from the inner annular wall 30 and mates with boss 20 which protrudes through an opening 46 in the tubular column 10. Aligned openings 48 and 50 extend through the bridge 42 and the boss 20, as through the mating oblique surfaces thereof, to receive a control lever 52 which is secured to the boss 20 by screw-thread or other suitable fastening means 54. A shoulder 53 on control lever 52 holds the bridge 42 in engagement with boss 20. A set screw 56 projects through an opening in bridge 42 and against the control lever 52 to prevent the lever from loosening.

Movement of the shift lever 52 is conveyed to the automatic transmission mechanism by the sleeve 16 connected to the shift lever through the boss 20 and the shroud 22.

The transmission control sleeve 16 is maintained in spaced relation to and between the tubular column 10 and the steering shaft 12 by the boss 20 secured to the shroud 22 which extends about the tubular column 10, and cannot move axially due to the limitations of the movement of shroud 22 by the snap ring 34 and the annular shoulder 32.

What we claim is:

1. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, means preventing said inner annular wall member from moving axially upon the upper end of said steering column and retaining said inner annular wall member in rotatable engagement with said shoulder, said boss formed on said collar and the adjoining bridge of said shroud being formed to provide aligned openings, a transmission actuating lever projecting into said aligned openings, and means associated with said actuating lever for securing said boss and said bridge of said shroud rigidly together.

2. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, a snap ring retaining said inner annular wall member on the upper end of said steering column and in rotatable engagement with said shoulder and preventing axial movement thereon, said boss formed on said collar and the adjoining bridge of said shroud being formed to provide aligned openings, a transmission actuating lever projecting into said aligned openings, and means associated with said actuating lever for securing said boss and said bridge of said shroud rigidly together.

3. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, means for preventing said inner annular wall member from moving axially upon the upper end of said steering column and for retaining said inner annular wall member in rotatable engagement with said shoulder, said bridge of said shroud having a groove in the inner annular wall member thereof and receiving said boss formed on said collar, said bridge and said boss being formed to provide aligned openings, a transmission actuating lever projecting into said aligned openings, and means associated with said actuating lever for securing said boss and said bridge of said shroud rigidly together.

4. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, means for preventing said inner annular wall member from moving axially upon the upper end of said steering column and for retaining said inner annular wall member in rotatable engagement with said shoulder, said bridge of said shroud having a groove extending obliquely into the inner annular wall member thereof and mating with and receiving said boss, the mating surfaces of said bridge and said boss being formed to provide aligned openings, a transmission actuating lever projecting into said aligned openings, and means associated with said actuating lever for securing said boss and said bridge of said shroud rigidly together.

5. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, means for preventing said inner annular wall member from moving axially upon the upper end of said steering column and for retaining said inner annular wall member in rotatable engagement with said shoulder, said boss formed on said collar and the adjoining bridge of said shroud being formed to provide aligned openings, and a transmission actuating lever projecting through said aligned openings and being secured to said boss having a shoulder thereon retaining said bridge in engagement with said boss.

6. A transmission control device comprising a steering column having an annular shoulder formed adjacent the upper end thereof, a steering shaft within said steering column, a transmission control sleeve disposed about said steering shaft and adapted to rotate about said shaft, a collar secured upon the upper end of said sleeve and having an enlarged boss at one side thereof, a shroud disposed about the upper end of said steering column and having an upper edge adapted to merge with the lower edge of a steering hub adapted to be secured to said steering shaft, said shroud being formed to provide annular outer and inner wall members having a bridge joining said walled members to one another at one side of said shroud and with the inner annular wall member of said shroud disposed about and rotatably engaging said steering column above said annular shoulder, means preventing said inner annular wall member from moving axially upon the upper end of said steering column and for retaining said inner annular wall member in rotatable engagement with said shoulder, said boss formed on said collar and the adjoining bridge of said shroud being formed to provide aligned openings, a transmission actuating lever projecting into said aligned openings, means associated with said actuating lever for securing said boss and said bridge of said shroud rigidly together, and having said transmission control sleeve maintained in spaced relation to and between said steering shaft and said steering column by said boss on said transmission control sleeve secured to said shroud extending about said steering column.

CLOVIS W. LINCOLN.
ERROL A. SCHROEDER.

No references cited.